(12) United States Patent
Michaelson (10) Patent No.: US 12,150,429 B2
(45) Date of Patent: Nov. 26, 2024

(54) GARDENING GLOVE AND METHOD OF MANUFACTURING THE SAME

(71) Applicant: HandsOn Equine, LLC, Mansfield, TX (US)

(72) Inventor: Jay Michaelson, Mansfield, TX (US)

(73) Assignee: HandsOn Equine, LLC, Mansfield, TX (US)

( * ) Notice: Subject to any disclaimer, the term of this patent is extended or adjusted under 35 U.S.C. 154(b) by 992 days.

(21) Appl. No.: 17/145,510

(22) Filed: Jan. 11, 2021

(65) Prior Publication Data

US 2021/0127635 A1 May 6, 2021

Related U.S. Application Data

(63) Continuation-in-part of application No. 15/918,085, filed on Mar. 12, 2018, now abandoned, which is a
(Continued)

(51) Int. Cl.
*A01K 13/00* (2006.01)
*A41D 19/00* (2006.01)
(Continued)

(52) U.S. Cl.
CPC .......... *A01K 13/001* (2013.01); *A01K 13/002* (2013.01); *A41D 19/00* (2013.01); *A41D 19/01505* (2013.01); *A46B 5/04* (2013.01); *B29C 45/16* (2013.01); *B29C 45/1701* (2013.01); *B29C 51/26* (2013.01); *A41D 19/0024* (2013.01); *A41D 19/01547* (2013.01); *A46B 2200/1093* (2013.01); *B29K 2027/06* (2013.01); *B29L 2009/00* (2013.01); *B29L 2031/4864* (2013.01)

(58) Field of Classification Search
CPC .................................................. B29L 231/486
See application file for complete search history.

(56) References Cited

U.S. PATENT DOCUMENTS 168,836 A 10/1875 Hall
277,173 A 5/1883 Thompson
(Continued)

FOREIGN PATENT DOCUMENTS

CN 204540917 U 2/2018
KR 2012084347 A 7/2012
(Continued)

OTHER PUBLICATIONS

*Allstar Innovations True Touch Five Finger Deshedding Glove.* https://www.amazon.com/Allstar--Innovations-Deshedding-Efficient-Grooming/dp/B01D1ZULK4.
(Continued)

*Primary Examiner* — Richale L Quinn
(74) *Attorney, Agent, or Firm* — FisherBroyles LLP; Craig Mueller (57) ABSTRACT

A gardening glove consisting of a glove liner defining a plurality of fingers, a thumb, and a palm is provided. The glove liner is placed on a first glove mandrel and received inside an injection mold configured to inject hot liquid PVC material on the glove liner's palm, fingers, and thumb, creating patterns of raised nodules that facilitate digging, for example.

18 Claims, 5 Drawing Sheets

Related U.S. Application Data continuation-in-part of application No. 15/449,670, filed on Mar. 3, 2017, now abandoned, which is a continuation of application No. 14/723,998, filed on May 28, 2015, now abandoned.

(60) Provisional application No. 62/004,105, filed on May 28, 2014.

(51) Int. Cl.

| | |
|---|---|
| *A41D 19/015* | (2006.01) |
| *A46B 5/04* | (2006.01) |
| *B29C 45/16* | (2006.01) |
| *B29C 45/17* | (2006.01) |
| *B29C 51/26* | (2006.01) |
| *B29K 27/06* | (2006.01) |
| *B29L 9/00* | (2006.01) |
| *B29L 31/48* | (2006.01) |

(56) References Cited

U.S. PATENT DOCUMENTS

| | | | |
|---|---|---|---|
| 730,051 A | 6/1903 | Scott | |
| 1,161,719 A * | 11/1915 | Norton | A61H 7/003 |
| | | | 401/266 |
| D54,333 S | 12/1919 | Reynolds | |
| 1,346,683 A | 7/1920 | Reynolds | |
| 1,559,114 A * | 10/1925 | Maranville | D06F 1/00 |
| | | | 2/168 |
| 1,612,822 A | 1/1927 | Jones | |
| 1,885,572 A | 11/1932 | Wood | |
| 1,979,130 A | 10/1934 | Wiley | |
| 2,187,430 A | 1/1940 | Olmsted | |
| 2,227,707 A | 1/1941 | Cooper | |
| 2,242,318 A | 5/1941 | Mosier | |
| 2,465,136 A | 3/1949 | Troccoli | |
| 2,559,788 A | 7/1951 | Patterson, Jr. | |
| 2,562,418 A | 7/1951 | Enrico | |
| 2,657,391 A | 11/1953 | Crandon | |
| 2,702,906 A | 3/1955 | Causse | |
| 2,949,610 A | 8/1960 | Lutsky | |
| 3,341,861 A | 9/1967 | Robbins | |
| 3,574,885 A | 4/1971 | Jones | |
| 3,643,386 A | 2/1972 | Grzyll | |
| 3,883,899 A | 5/1975 | Ganz | |
| 4,038,787 A | 8/1977 | Bianchi | |
| 4,084,265 A | 4/1978 | Anfelt | |
| 4,094,014 A | 6/1978 | Schroeder | |
| 4,107,840 A * | 8/1978 | Kupperman | A47J 17/02 |
| | | | 451/523 |
| 4,168,545 A | 9/1979 | Kuppernnan | |
| 4,195,365 A | 4/1980 | Eynnan | |
| D256,183 S | 8/1980 | Kuppernnan | |
| D256,184 S | 8/1980 | Kupperman | |
| D268,968 S * | 5/1983 | Sami | D32/46 |
| 4,497,072 A | 2/1985 | Watanabe | |
| 4,751,750 A | 6/1988 | Tepley | |
| 4,766,914 A | 8/1988 | Briggs | |
| 5,117,509 A | 6/1992 | Bowers | |
| 5,169,251 A | 12/1992 | Davis | |
| 5,316,294 A | 5/1994 | Turangan | |
| D347,709 S * | 6/1994 | Pearson | D28/63 |
| 5,384,083 A * | 1/1995 | Dawn | A41D 19/01558 |
| | | | 264/137 |
| 5,405,310 A | 4/1995 | Yoo | |
| 5,419,014 A * | 5/1995 | Piantedosi | A47L 13/19 |
| | | | 15/104.94 |
| D359,381 S | 6/1995 | Henriquez | |
| 5,442,816 A | 8/1995 | Seketa | |
| 5,444,874 A | 8/1995 | Samelian | |
| D363,606 S * | 10/1995 | Abrahamson | D2/610 |
| 5,467,483 A | 11/1995 | Saadatmanesh | |
| 5,524,575 A * | 6/1996 | Lennon | A46B 5/04 |
| | | | 15/246.2 |
| 5,561,856 A | 8/1996 | Pesco | |
| 5,625,900 A | 5/1997 | Hayes | |
| 5,676,092 A * | 10/1997 | Ortolivo | A47L 13/18 |
| | | | 119/650 |
| 5,682,837 A * | 11/1997 | Courtney | A46B 5/04 |
| | | | 119/664 |
| 5,715,539 A | 2/1998 | Benecki | |
| 5,794,266 A | 8/1998 | Han | |
| D398,086 S | 9/1998 | Ferdenzi | |
| 5,829,061 A | 11/1998 | Visgil | |
| 5,926,847 A | 7/1999 | Ebert | |
| 5,956,770 A | 9/1999 | Dennis | |
| 5,983,395 A * | 11/1999 | Lei | A41D 19/0055 |
| | | | 2/163 |
| 6,000,059 A | 12/1999 | Abts | |
| 6,018,837 A | 2/2000 | Andreu | |
| 6,035,444 A | 3/2000 | McGrew | |
| 6,041,438 A | 3/2000 | Kirkwood | |
| 6,044,494 A | 4/2000 | Kang | |
| 6,055,669 A | 5/2000 | Albert | |
| 6,081,928 A * | 7/2000 | Bourne | A41D 19/0055 |
| | | | 2/163 |
| 6,098,234 A | 8/2000 | Jackson, Jr. | |
| 6,109,214 A | 8/2000 | Rampersad | |
| 6,154,885 A | 12/2000 | Kobayashi | |
| 6,185,747 B1 | 2/2001 | Hughes | |
| 6,202,217 B1 | 3/2001 | Karall | |
| 6,216,276 B1 | 4/2001 | Ebert | |
| 6,374,417 B1 * | 4/2002 | Stagnitta | A41D 19/01547 |
| | | | 2/163 |
| 6,401,252 B1 | 6/2002 | Dean | |
| 6,408,442 B1 | 6/2002 | Kang | |
| 6,427,248 B1 | 8/2002 | Albert | |
| D468,870 S | 1/2003 | Bufford | |
| 6,513,166 B1 | 2/2003 | Landis | |
| 6,513,998 B1 | 2/2003 | Barry | |
| 6,526,593 B2 | 3/2003 | Sajovic | |
| 6,544,626 B1 | 4/2003 | Minges | |
| 6,553,576 B1 | 4/2003 | Knapp | |
| 6,557,178 B1 | 5/2003 | Hoover | |
| 6,604,244 B1 | 8/2003 | Leach | |
| 6,640,341 B1 | 11/2003 | Calvert | |
| 6,675,392 B2 | 1/2004 | Albert | |
| 6,715,152 B2 | 4/2004 | Mazzarolo | |
| 6,745,403 B2 | 6/2004 | Sajovic | |
| 6,810,553 B1 | 11/2004 | Otsuji | |
| D507,683 S | 7/2005 | Salzman | |
| D511,028 S | 10/2005 | Salzman | |
| D512,540 S | 12/2005 | Salzman | |
| D517,278 S | 3/2006 | Chernick | |
| 7,020,898 B1 | 4/2006 | Pucci | |
| 7,033,100 B2 | 4/2006 | Barton | |
| 7,051,377 B1 | 5/2006 | Milner | |
| D536,509 S | 2/2007 | Lietz | |
| D536,857 S | 2/2007 | Schuller | |
| D537,232 S * | 2/2007 | Schuller | D2/617 |
| D540,991 S | 4/2007 | Kishihara | |
| D544,665 S | 6/2007 | Keene | |
| 7,234,170 B2 * | 6/2007 | Simic | A41D 19/0058 |
| | | | 2/161.6 |
| D548,926 S * | 8/2007 | Schuller | D2/617 |
| D549,928 S * | 9/2007 | Schuller | D2/617 |
| D555,876 S | 11/2007 | Kishihara | |
| D560,314 S | 1/2008 | VanErmen | |
| D565,802 S * | 4/2008 | Schuller | D29/117.2 |
| D569,578 S | 5/2008 | Yan | |
| D581,127 S | 11/2008 | Bautista | |
| 7,487,553 B2 | 2/2009 | Price | |
| D588,769 S * | 3/2009 | Nourollah | D32/43 |
| D596,807 S | 7/2009 | Walding | |
| D602,655 S | 10/2009 | Padolina-Archibald | |
| D605,377 S | 12/2009 | House | |
| D608,978 S | 2/2010 | Votel | |
| 7,707,654 B1 | 5/2010 | Spence | |
| D617,531 S | 6/2010 | Harvey | |
| 7,735,153 B1 | 6/2010 | Romiti | |
| 7,788,737 B2 | 9/2010 | Baker | |
| 7,823,244 B2 | 11/2010 | Knopow | |
| D645,212 S | 9/2011 | Gellis | |

(56) References Cited

U.S. PATENT DOCUMENTS

| | | | |
|---|---|---|---|
| 8,028,348 B2 | 10/2011 | Hull | |
| D648,919 S | 11/2011 | Gellis | |
| D649,292 S | 11/2011 | Choi | |
| D649,328 S | 11/2011 | Copeland | |
| 8,062,101 B1 | 11/2011 | Friend | |
| 8,065,750 B2 | 11/2011 | Dassler | |
| D650,532 S | 12/2011 | Choi | |
| 8,100,089 B1 | 1/2012 | Francoeur | |
| 8,388,347 B2 | 3/2013 | Beville | |
| 8,469,619 B1 * | 6/2013 | Lewis | A46B 5/04 401/7 |
| D690,884 S | 10/2013 | Li | |
| D698,454 S * | 1/2014 | DiStefano | D24/215 |
| D700,403 S | 2/2014 | Gellis | |
| D707,899 S * | 6/2014 | McPhaul | D28/63 |
| 8,794,189 B1 | 8/2014 | Dahlquist | |
| 8,938,814 B2 * | 1/2015 | Tomono | A41D 19/01558 2/161.8 |
| 9,003,569 B2 | 4/2015 | Ramirez | |
| D733,364 S | 6/2015 | Choi | |
| D735,968 S | 8/2015 | Furlong | |
| 9,167,948 B2 | 10/2015 | Tucker | |
| D752,296 S | 3/2016 | Urbelis | |
| D752,818 S | 3/2016 | Lai | |
| 9,302,171 B1 | 4/2016 | Iacono | |
| D756,594 S | 5/2016 | Woody | |
| D774,724 S | 12/2016 | Daniel | |
| D775,778 S | 1/2017 | Ekawa | |
| 9,555,567 B2 | 1/2017 | Gellis | |
| D780,380 S * | 2/2017 | Daniels | D2/617 |
| D782,782 S | 4/2017 | Shaw | |
| D783,229 S | 4/2017 | Gellis | |
| 9,622,457 B1 * | 4/2017 | Salter | A01K 13/002 |
| D789,029 S | 6/2017 | Katopis | |
| D789,652 S | 6/2017 | Gellis | |
| D792,676 S * | 7/2017 | Mikesell | D2/619 |
| D809,714 S | 2/2018 | Lim | |
| D815,362 S | 4/2018 | Kang | |
| D815,368 S * | 4/2018 | Fei | D30/158 |
| D816,291 S | 5/2018 | Chou | |
| D816,941 S * | 5/2018 | Michaelson | B29C 45/1701 D30/158 |
| D818,665 S | 5/2018 | Votel | |
| D819,295 S | 6/2018 | Kaniaru | |
| D825,886 S | 8/2018 | Jaeger | |
| D827,946 S * | 9/2018 | Leng | D30/158 |
| D829,407 S | 10/2018 | Kiernan | |
| D831,929 S | 10/2018 | Duarte | |
| D837,482 S | 1/2019 | Chou | |
| D839,488 S | 1/2019 | Whiteside | |
| D841,934 S * | 3/2019 | Jaeger | D2/617 |
| D842,551 S | 3/2019 | Fei | |
| D849,358 S | 5/2019 | Votel | |
| 10,383,381 B2 * | 8/2019 | Price | A63B 71/141 |
| D858,906 S * | 9/2019 | Michaelson | D30/158 |
| D862,032 S | 10/2019 | Votel | |
| D880,814 S | 4/2020 | Butts | |
| D883,582 S * | 5/2020 | Bui | D30/158 |
| D893,111 S * | 8/2020 | Michaelson | D30/158 |
| D988,615 S * | 6/2023 | Zhang | D30/158 |
| D998,244 S * | 9/2023 | Whiteside | D2/617 |
| D1,009,375 S * | 12/2023 | Whiteside | D2/617 |
| 2001/0044950 A1 | 11/2001 | Sajovic | |
| 2003/0037364 A1 | 2/2003 | Albert | |
| 2003/0051285 A1 | 3/2003 | Bower | |
| 2003/0140395 A1 | 7/2003 | Newcomb | |
| 2004/0025227 A1 | 2/2004 | Jaeger | |
| 2004/0081801 A1 | 4/2004 | Albert | |
| 2004/0148675 A1 | 8/2004 | Powell | |
| 2004/0199978 A1 | 10/2004 | Cass | |
| 2005/0072374 A1 | 4/2005 | Claire | |
| 2005/0111897 A1 | 5/2005 | Presniakov | |
| 2005/0132467 A1 | 6/2005 | Tippey | |
| 2006/0041991 A1 | 3/2006 | Kim | |
| 2006/0130212 A1 | 6/2006 | Kishihara | |
| 2006/0168706 A1 | 8/2006 | Auger | |
| 2006/0225665 A1 | 10/2006 | Roman-Barcelo | |
| 2006/0288954 A1 | 12/2006 | Graunstadt | |
| 2007/0028356 A1 | 2/2007 | Cabauy | |
| 2007/0277288 A1 * | 12/2007 | Sing | A46B 5/04 2/159 |
| 2007/0283516 A1 | 12/2007 | Rasmussen | |
| 2008/0022943 A1 | 1/2008 | Jones | |
| 2008/0041319 A1 * | 2/2008 | Rasmussen | A01K 13/002 15/104.94 |
| 2009/0007313 A1 | 1/2009 | Boorsma | |
| 2009/0139007 A1 | 6/2009 | Bevier | |
| 2009/0139010 A1 * | 6/2009 | Bevier | A63B 71/148 2/163 |
| 2009/0183296 A1 | 7/2009 | Hardee | |
| 2009/0205105 A1 | 8/2009 | Pinkart | |
| 2009/0282606 A1 | 11/2009 | Bordella | |
| 2010/0024095 A1 | 2/2010 | Gellis | |
| 2010/0071114 A1 | 3/2010 | Jaeger | |
| 2010/0083420 A1 * | 4/2010 | Bouckaert | A41D 19/01547 2/163 |
| 2011/0067717 A1 | 3/2011 | McHugh | |
| 2011/0107498 A1 | 5/2011 | Chang | |
| 2011/0131703 A1 | 6/2011 | Mazzarolo | |
| 2011/0252536 A1 | 10/2011 | Hendon | |
| 2011/0258750 A1 | 10/2011 | Hayashi et al. | |
| 2011/0296582 A1 | 12/2011 | Bevier | |
| 2011/0314588 A1 | 12/2011 | Gaskins | |
| 2012/0180192 A1 | 7/2012 | Staszewski | |
| 2012/0204321 A1 | 8/2012 | Connelly | |
| 2012/0288628 A1 | 11/2012 | Nethsinghe | |
| 2013/0041302 A1 | 2/2013 | Williams | |
| 2013/0055963 A1 | 3/2013 | Salter | |
| 2013/0091618 A1 | 4/2013 | Tanaka | |
| 2014/0018714 A1 | 1/2014 | Dolenz | |
| 2014/0033392 A1 | 2/2014 | Bulan | |
| 2014/0033986 A1 | 2/2014 | Hannan | |
| 2014/0060563 A1 | 3/2014 | Haynes | |
| 2015/0082511 A1 | 3/2015 | Bryant | |
| 2015/0104348 A1 * | 4/2015 | Nichols | A61Q 15/00 424/70.21 |
| 2015/0181955 A1 | 7/2015 | Hughes | |
| 2016/0037750 A1 * | 2/2016 | Schuster | A46B 5/04 119/633 |
| 2016/0073611 A1 | 3/2016 | Hightower | |
| 2016/0073711 A1 | 3/2016 | Fitzgerald | |
| 2016/0113337 A1 | 4/2016 | Kerr-Maddox | |
| 2016/0120242 A1 | 5/2016 | Thompson | |
| 2016/0198922 A1 | 7/2016 | Simoni | |
| 2016/0367108 A1 | 12/2016 | Golub | |
| 2017/0142931 A1 * | 5/2017 | Michaelson | A01K 13/002 |
| 2018/0078028 A1 | 3/2018 | Lentz | |
| 2018/0125130 A1 | 5/2018 | Ju | |
| 2018/0263315 A1 * | 9/2018 | Visokey | A41D 19/0082 |
| 2019/0014838 A1 | 1/2019 | Price | |
| 2021/0077891 A1 * | 3/2021 | Pechtold | A63B 71/148 |
| 2021/0127635 A1 * | 5/2021 | Michaelson | B29C 45/16 |

FOREIGN PATENT DOCUMENTS

| | | | | |
|---|---|---|---|---|
| RU | 2283008 | | 9/2006 | |
| RU | 2462966 | | 10/2012 | |
| SE | 201200495 A1 | | 8/2012 | |
| TW | 384529 U | | 7/2010 | |
| WO | WO 8400292 | | 2/1984 | |
| WO | WO 9525428 | | 9/1995 | |
| WO | WO-9525428 A1 * | | 9/1995 | A01K 13/001 |
| WO | WO 9609781 | | 4/1996 | |

OTHER PUBLICATIONS

International Search Report from related WO2016190926. Dec. 1, 2016. 5 pages.

Written Opinion from related WO2016190926. Dec. 1, 2016. 5 pages.

* cited by examiner

GARDENING GLOVE AND METHOD OF MANUFACTURING THE SAME

This application is a continuation-in-part of U.S. patent application Ser. No. 15/918,085, filed Mar. 12, 2018, which is a continuation-in-part of abandoned U.S. patent application Ser. No. 15/449,670, filed on Mar. 3, 2017, which is a continuation of abandoned U.S. patent application Ser. No. 14/723,998, filed on May 28, 2015, which claims the benefit of U.S. Provisional Patent Application Ser. No. 62/004,105, filed on May 28, 2014, the entireties of which are incorporated by reference herein.

FIELD OF THE INVENTION

This invention relates to a gardening glove and, more particularly, but not by way of limitation, to a flexible glove or mitten, having a space that accommodates at least one finger and a thumb. The glove is characterized by having a pattern of comb-like finger, thumb, and palm nodules.

BACKGROUND OF THE INVENTION

Heretofore, bathing and grooming mitts have been used for cleaning an animal. These types of mitts, designed as "one-size fits all," have been found not to be anatomically or ergonomically correct for human hands. Also, these types of mitts slip easily of a grooming hand. Further, they are not designed to bathe and groom contours of an animal's legs, tail, head, face, and other difficult places on the animal's body.

Also, curry combs are a standard in grooming large animals. Curry combs can be harsh on the animal's skin or fur and generally are found not adequate for cleaning and grooming the animal's legs, tail, head, or face.

The subject animal grooming glove eliminates the above mentioned problems related to the difficulty in washing and grooming an animal, with the objects, advantages and benefits of the glove as described herein.

Gardening gloves are comprised of materials that afford little protection from the elements. More specifically, such gloves are sometimes only designed to keep the user's hands clean and, thus, do not protect the user from cuts, punctures, etc.

SUMMARY OF THE INVENTION

In view of the foregoing, it is one aspect of some embodiments of the present invention to provide a unique ergonomic and anatomically-shaped animal grooming glove for washing and grooming an animal's legs, tail, body, head, and face. The glove is designed for fitting various sizes of the hand with fold areas for ease in gripping and flexing glove fingers, thumb, and palm. The glove is also designed for ease in animal handling when washing, scrubbing, and grooming.

It is yet another aspect of some embodiments of the invention to provide a glove that includes outwardly extending, soft, flexible nodules in comb-like spaced-apart patterns. The patterns of the nodules are placed on the fingers, thumb, and palm of the glove. The nodules on the glove, particularly on the fingers, provide more thorough washing, cleaning, shedding, and ease in grooming the animal. This key feature helps the animal to be more patient, less anxious and reduces the animal's need to run away.

Still another object of the invention is the glove can be used equally well for gardening, seed planting, and various uses as a work glove. For example, in one embodiment, the glove includes outwardly extending rigid nodules in spaced-apart patterns. The rigid nodules' patterns are placed on the glove fingers, thumb, and/or palm. The nodules reinforce the fingers and palm and provide extra protection from sharp objects like nails, stinging insects, thorns, rocks, and broken glass. The nodules, therefore, facilitate digging, weeding, exposing root balls/flares, spreading mulcher course tree trimmings, breaking up dirt clumps, etc.

As with the pet grooming glove described above, the nodules may extend to a point adjacent to the glove's fingertip(s) or thumb tip, or the nodules may extend around the fingertip(s) or thumb tip to provide nodules on the upper portion of a finger(s)/thumb. Furthermore, the stiffness of the nodules may vary as a function of finger/location, wherein nodules adjacent to the finger or thumb tips may be stiffer than those found at the digit's root. The nodules provided on the fingers/thumb may also be stiffer than those provided on the palm. One of ordinary skill in the art will appreciate that the shape of the nodules may vary along the length of a finger, for example. In one embodiment, the nodules provided at the fingertips are scoop or hook-shaped to facilitate digging. One of ordinary skill in the art will also appreciate that the character of the nodules (e.g., nodule density and/or shape) does not have to be consistent from digit-to-digit or along digit length/width. In one embodiment, at least one digit is devoid of nodules.

A glove liner that receives the nodules is made of flexible, compliant material but is cut and puncture-resistant, as mentioned above. The glove liner may also include a widened opening that is selectively closed by a wrist strap. The glove liner may be resistant to soil, chemicals, and moisture and be configured to relax to a pre-use state after the user's hand is removed. The glove liner may also accommodate padding that may work in concert with the nodules to absorb vibration common when using some gardening tools. At least a portion of the glove is made of PVC and nitrile in one embodiment, which is hypoallergenic and chemical/mildew resistant.

The subject invention includes a right-hand glove or a left-hand glove used to clean and groom large and small domesticated animals or gardening. Each glove includes fingers, a thumb, and a palm. The glove also includes fold spaces or fold areas on the fingers, thumb, and palm for ease in flexing and gripping objects, such as soap, wash rag, tools, roots, etc.

Thus, it is another aspect of some embodiments of the present invention to provide a glove, comprising: a liner consisting of at least one finger, a thumb, a palm, and a heel; a plurality of finger pads provided on the at least one finger, the plurality of finger pads being spaced from each other to define a finger fold space, wherein each finger pad includes a plurality of finger nodules; a plurality of thumb pads provided on the thumb, the plurality of thumb pads being spaced from each other to define a thumb fold space, wherein each thumb pad includes a plurality of thumb nodules; an upper palm pad with a plurality of upper palm nodules located adjacent to the fingers of the glove liner; and a lower palm pad with a plurality of lower palm nodules located adjacent to the heel of the glove liner and separated from the upper palm pad by a palm fold space, wherein the lower palm pad is discontinuous to define a lower palm fold space that extends from a heel edge of the lower palm pad towards the upper palm pad, wherein the lower palm fold space does not extend entirely through the lower portion.

It is still yet another aspect to provide a glove, comprising: a liner consisting of at least one finger, a thumb, a palm, and a heel; a plurality of finger pads provided on the at least one finger, the plurality of finger pads being spaced from each other to define a finger fold space, wherein each finger pad includes a plurality of finger nodules; a plurality of thumb pads provided on the thumb, the plurality of thumb pads being spaced from each other to define a thumb fold space, wherein each thumb pad includes a plurality of thumb nodules; an upper palm pad with a plurality of upper palm nodules located adjacent to the fingers of the glove liner; and a lower palm pad with a plurality of lower palm nodules located adjacent to the heel of the glove liner and separated from the upper palm pad by a lower palm fold space, wherein the lower palm pad is discontinuous to define a palm fold space that extends from a heel edge of the lower palm pad towards the upper palm pad.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION OF THE PREFERRED EMBODIMENTS

Figure 1:
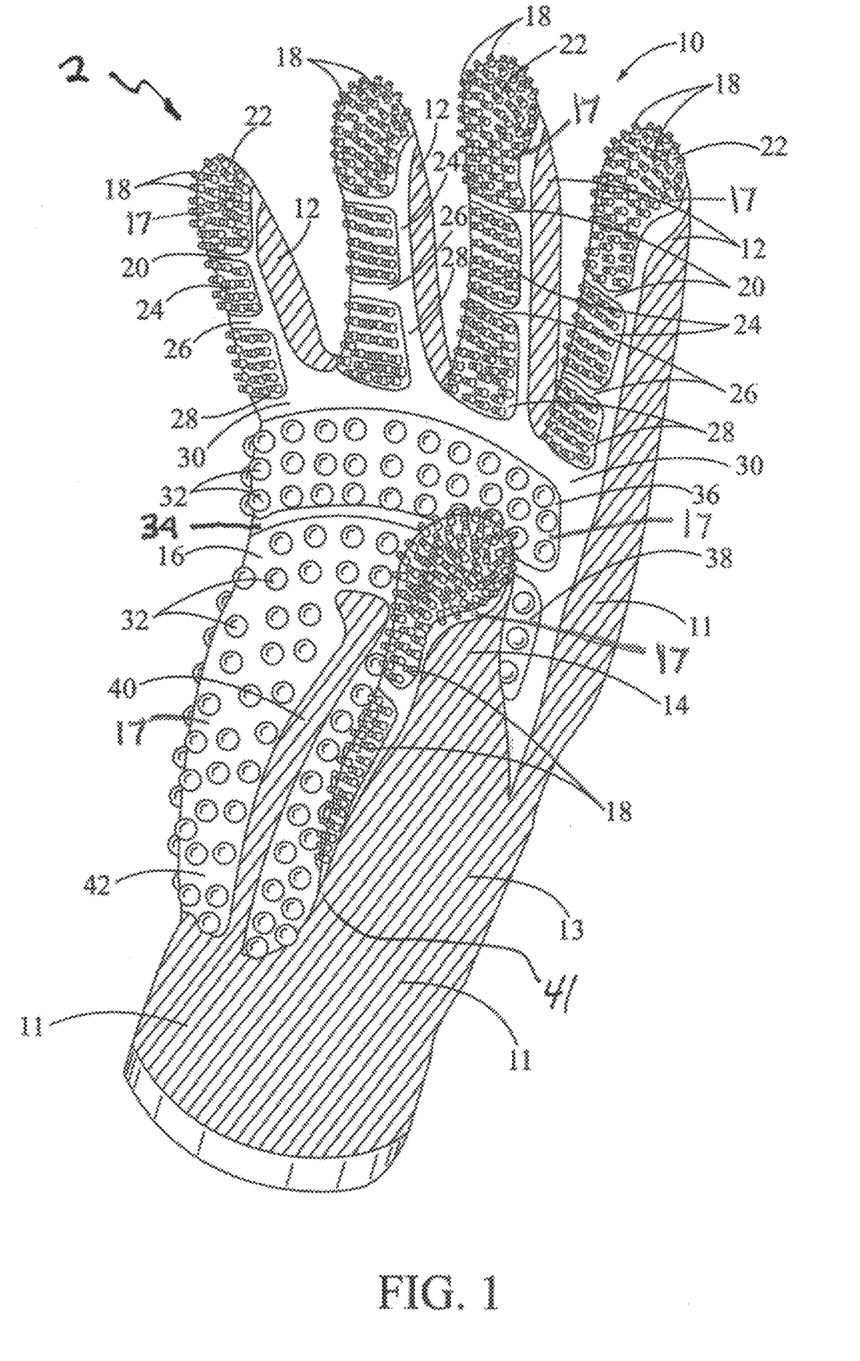
FIG. 1 is a front perspective view of a glove of one embodiment of the present invention.

FIG. 1 is a front perspective view of a glove 2 is illustrated having general reference numeral 10. The glove 10 can be either a right-hand glove or a left-hand glove and is made of a mesh fabric material 11, which is used to make a seamless glove liner 13. A palm side of a right-hand glove is shown in the drawings.

The glove liner 13 includes fingers 12, a thumb 14, and a palm 16. The glove liner is characterized by having pattern pads 17, used to form spaced apart, soft, patterns of pointed, finger, and thumb nodules 18 on the fingers 12 and the thumb 14. It should be noted the pointed finger and thumb nodules 18 are used in some instances for washing and cleaning difficult areas around the body of the animal and particularly around the eyes, ears, mouth, and nose of the animal.

The glove liner 13 includes fold spaces 20 or fold areas between a tip 22 and a middle 24 of the fingers 12 and fold spaces 26 between the middle 24 and the base 28 of the fingers. Fold spaces 30 between the base 28 and the top of the palm 16 are provided. As mentioned above, the fold spaces 20, 26, and 30 in the fingers provide for flexing and gripping objects during the use of the glove 10.

The palm 16 of the glove liner 13 includes larger nodules 32 situated on pattern pads 17. The larger semispherical nodules 32 and the smaller, pointed finger and thumb nodules 18 are made of a plastic PVC material or the like. In some embodiments, the nodules 32 are not semispherical.

The palm 16 includes a palm center fold space 34 between a top portion 36 of the palm and a middle portion 38 of the palm. Also, a palm fold space 40 is shown that begins between a base 41 of the thumb 14 and a heal 42 of the palm 16 and extends towards the fingers. The palm fold space 40 allows for ease in flexing and folding the thumb 14 next to the palm 16.

Figure 2:
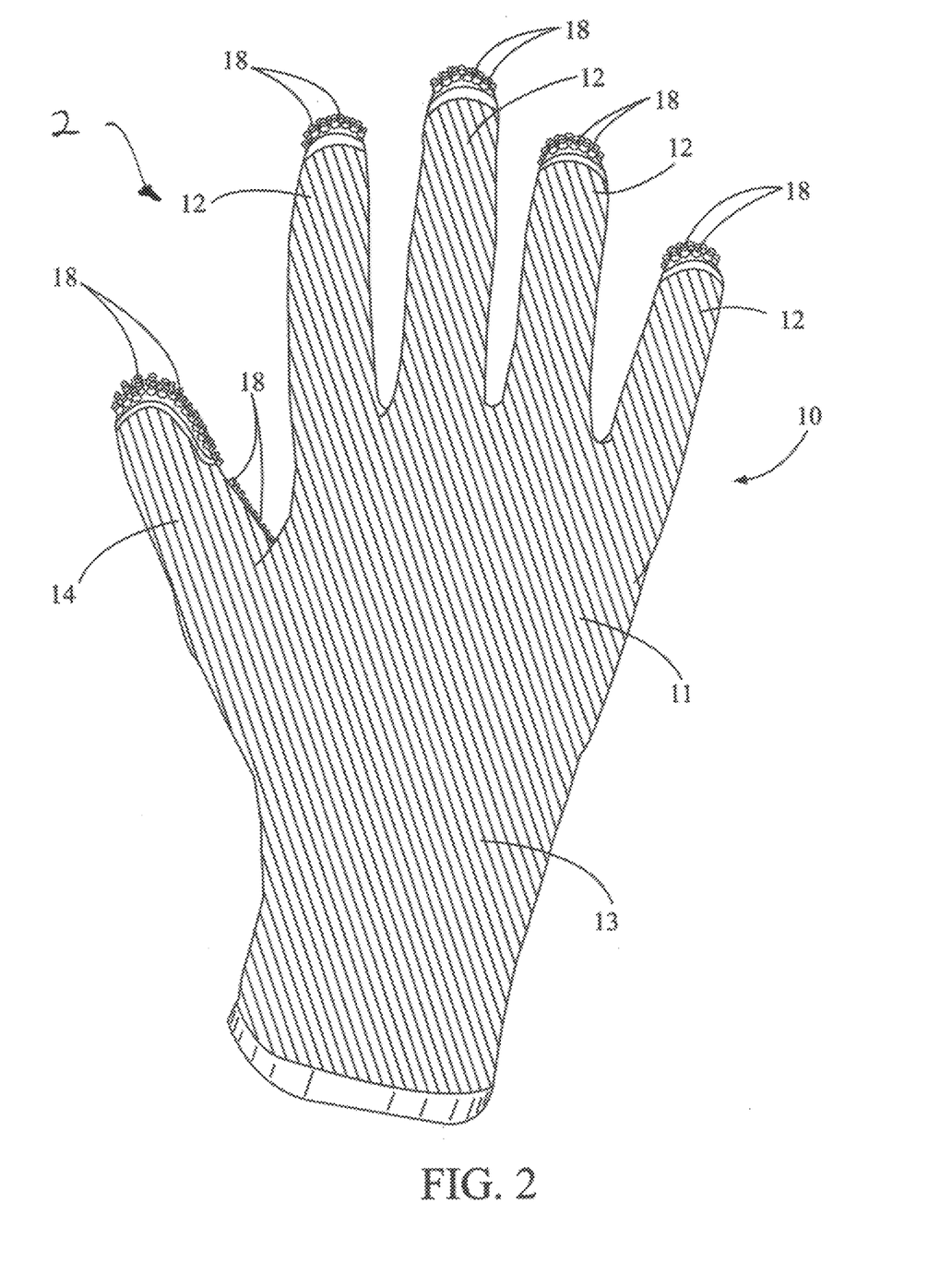
FIG. 2 is a rear perspective view of the glove of FIG. 1.

FIG. 2 is a rear perspective view of the glove 10. The glove liner 13 is made of mesh fabric material 11. In this view, the pointed finger and thumb nodules 18 extend upwardly from the tips 22 of the fingers 12 and the thumb 14.

Figure 3:
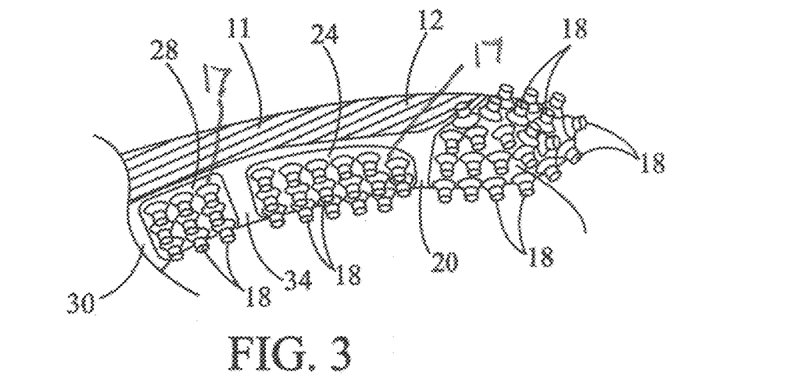
FIG. 3 is a detailed perspective view of an extended finger.

In FIG. 3, a perspective view of a portion of one of the glove's fingers 12 is shown in an extended position, with the pattern of the spaced apart finger and thumb nodules 18 extending outwardly from the tip 22, the middle 24, and the base 28 of the finger.

Figure 4:
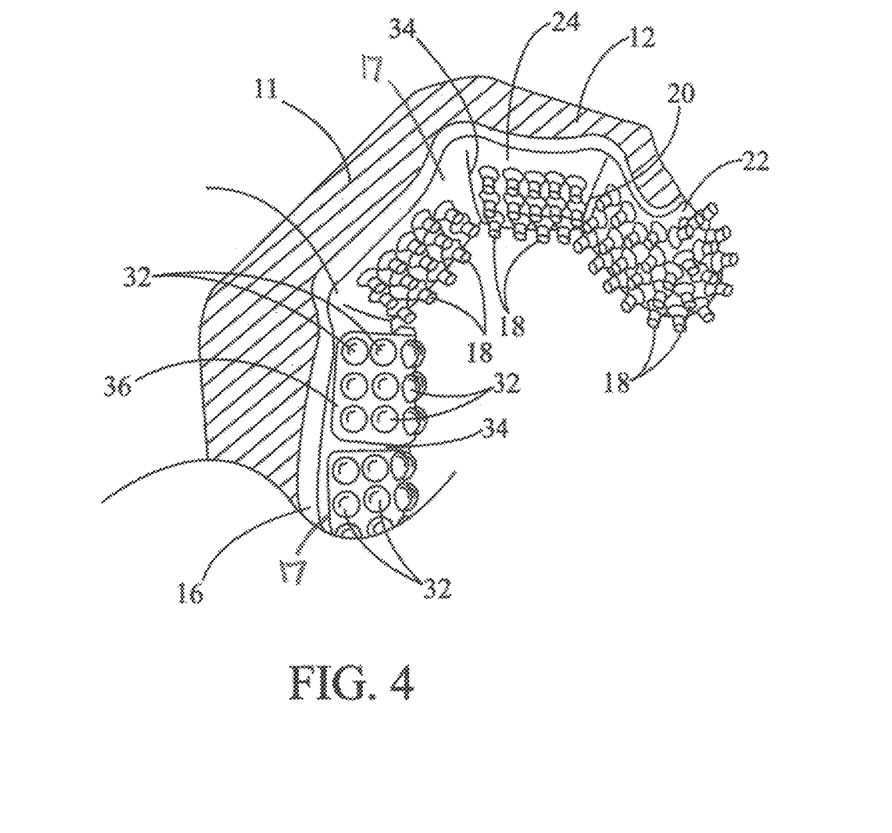
FIG. 4 is a detailed perspective view of a flexed finger.

In FIG. 4, another perspective view of a portion of one of the glove's fingers 12 is shown with the finger flexed on the fold spaces 20 and 34, between the spaced-apart pattern of finger and thumb nodules 18. In this drawing, the base 28 of the finger can be seen folded on a fold space 30 next to the top portion 36 of the palm 16.

Figure 5:
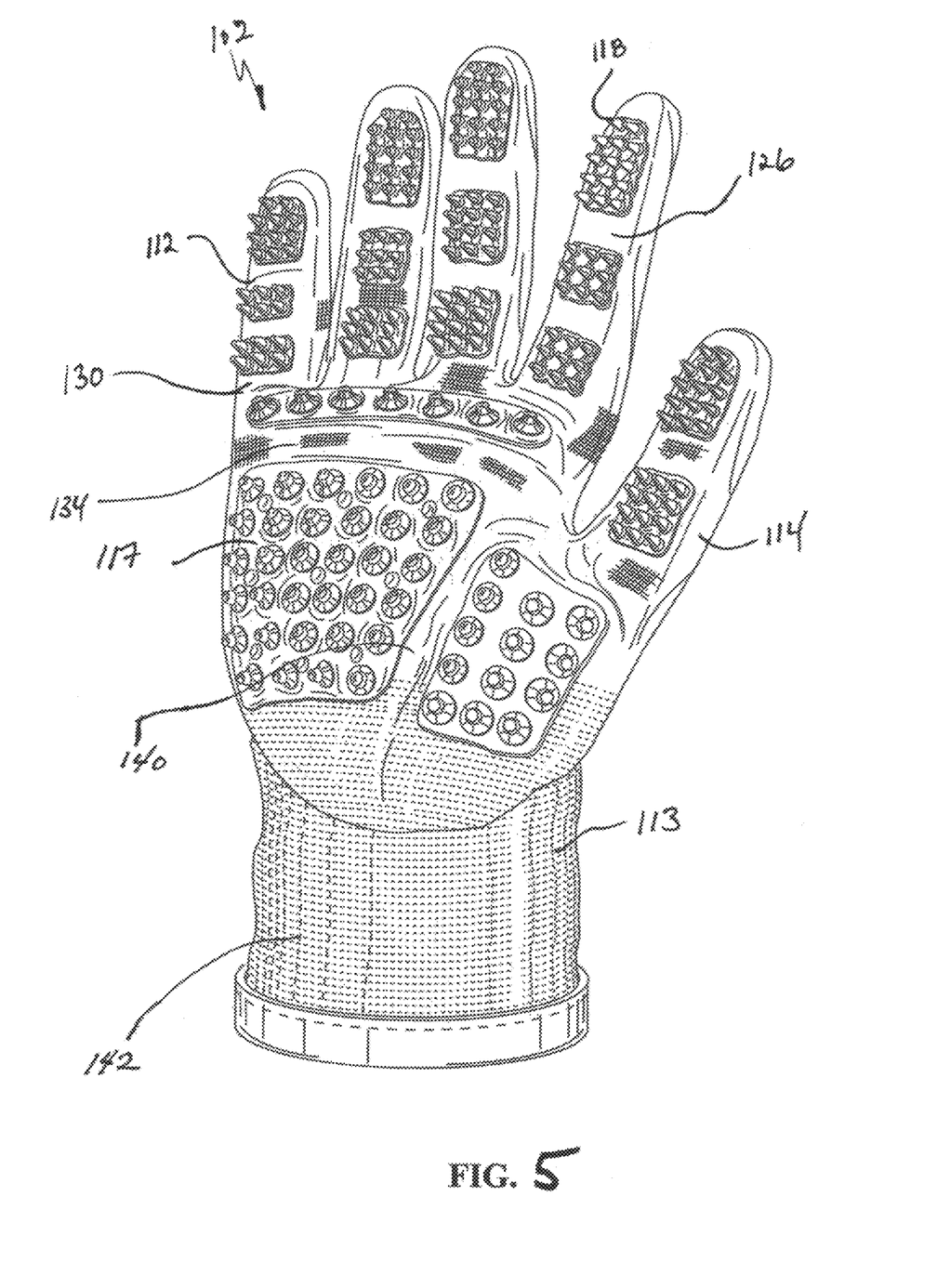
FIG. 5 is a front perspective view of a glove of another embodiment of the present invention.
Figure 6:
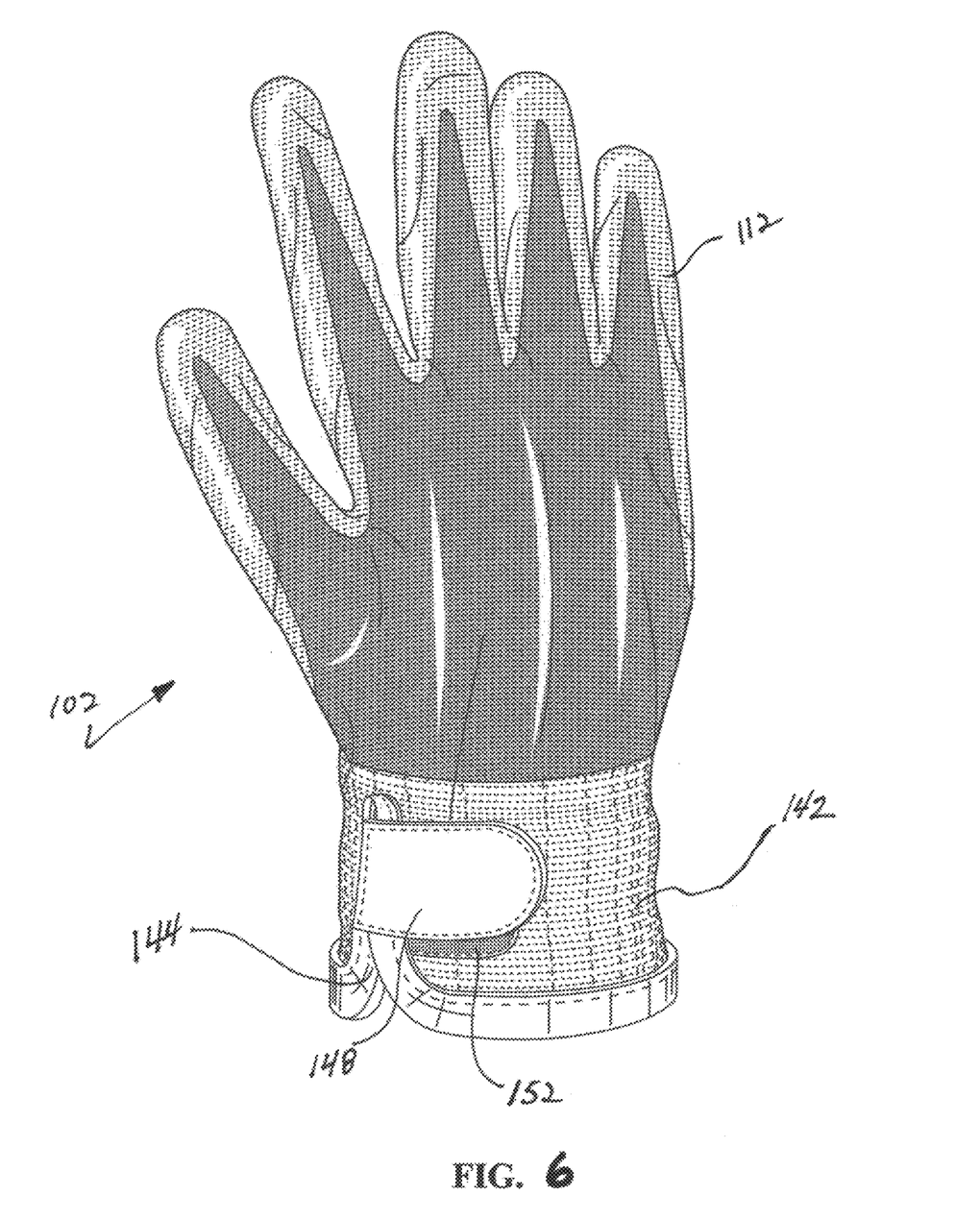
FIG. 6 is a rear perspective view of the glove of FIG. 5.

FIGS. 5 and 6 show an alternate embodiment of a glove 102 consisting of a puncture-resistant liner 113 configured into a plurality of fingers 112 and a thumb 114 emanating from a palm. The palm accommodates separated palm pads 117 that defines a palm fold space 140. An upper palm pad may also be included that is separated from the primary palm pad 117 by a fold space 134. The upper palm pad is also separated from the fingers by a fold space 130.

Each finger and the thumb includes a plurality of pads with nodules 118 extending therefrom, wherein each pad is separated by a fold space 126 as in the embodiments described above. The nodules on the fingers/thumb may be an of a different character as those provided on the palm. For example, the finger/thumb nodules may be stiffer and more rigid than those provided on the palm. In addition, the shape of the nodules provided on the finger/thumb may be different from those provided on the thumb. As in the embodiment shown in FIG. 1, the nodules on the fingers and/or thumb may extend around the tips of at least one digit.

A wrist portion 142 is interconnected to the palm and may include a slit 144 that allows the wrist portion 142 to be selectively expanded. A tab 148 may be provided to close the slit 144 using a selective interconnection member 152, such as hook and loop fasteners, snaps, zipper, or any other common closure mechanism.

In the manufacture of multi-layers of the subject glove 10 shown in FIGS. 1-6, the fabric material 11, making up the glove liner 13 of the glove 10, is woven using a multi-needle knitting/weaving automated needle machine.

The liner 13 is then placed around a two-dimensional, hand-shaped, flat metal, first glove mandrel. Typically, the glove liner 13 is made of a nylon fabric.

The first glove mandrel, with the liner 13, is then placed inside a double-sided vacuum, injection mold. One side of the mold includes a concave pattern for forming die pattern pads 17 and the nodules 18 and 32 on the pads on the liner 13.

The mold is configured to inject temperature-controlled hot liquid PVC material onto the palm's outer surface, the fingers, and the thumb of the glove liner 13. The injection of the PVC material permeates, infuses, and creates the pattern pads 17 on the glove liner 13 and raises upwardly the nodules 18. and 32 on the pads, as shown in the drawings. The mandrel and the glove liner are now removed from the vacuum injection mold, allowed to cool, and the glove is then removed from the mandrel.

The glove liner 13, with the pattern pads 17 and the nodules 18 and 32, is now placed on a three-dimensional, hand-shaped, second glove mandrel. The glove and mandrel are placed in a heat controlled chamber with rotating fans to dry heat cure the molded surfaces on the liner and allow the nodules 18 and 32 to cure in place on the pattern pads 17.

The glove liner 13 is now washed in a freshwater solution to clean and prepare the palm side of the glove for dipping in a heated nitrile bath. At this time, the palm side or the bottom half of the glove liner 13, with the nodules 18 and 32 formed on the pattern pads 17, is now dipped into a vat of hot, liquid nitrile rubber. The dipping of the glove forms a nitrile coating on the palm side of the glove.

The nitrile coating is a key feature in the making of the glove 10. The coating helps prevent static electricity by creating an insulated surface with a neutral electric charge. This feature of reducing or eliminating static electricity helps prevent animal hair and fur from clinging to the glove during washing and grooming, thus making the cleaning task easier.

After the dipping of glove 10 in the vat of nitrile rubber, the glove liner 13 with the nodules 18 and 32 and the second mandrel are removed from the nitrile rubber vat. The glove liner, nodules, and the second mandrel are now fed through a series of hot air blowers and heaters for air drying and heat curing the nodules, palm patterns, and the nitrile coating.

Finally, the air-dried glove and mandrel are washed in a clean water bath. The glove is removed from the second mandrel and paired with another glove for packaging and shipping.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A glove, comprising:
   a glove liner consisting of at least one finger, a thumb, a palm, and a heel;
   a plurality of finger pads provided on the at least one finger, the plurality of finger pads being spaced from each other to define a finger fold space, wherein each finger pad includes a plurality of finger nodules;
   a plurality of thumb pads provided on the thumb, the plurality of thumb pads being spaced from each other to define a thumb fold space, wherein each thumb pad includes a plurality of thumb nodules;
   an upper palm pad with a plurality of upper palm nodules located adjacent to the fingers of the glove liner; and
   a lower palm pad with a plurality of lower palm nodules located adjacent to the heel of the glove liner and separated from the upper palm pad by a palm fold space, wherein the lower palm pad is discontinuous to define a lower palm fold space that extends from a heel edge of the lower palm pad towards the upper palm pad, wherein the lower palm fold space does not extend entirely through the lower palm pad.

2. The glove of claim 1, wherein the finger nodules and thumb nodules are of a first configuration that differ from a second configuration of the upper and lower palm nodules.

3. The glove of claim 2, wherein the finger nodules and thumb nodules are pointed and the upper and lower palm nodules are semi-spherical.

4. The glove of claim 1, wherein the finger nodules extend around tips of the fingers, and wherein the thumb nodules extend around a tip of the thumb.

5. The glove of claim 1, wherein the finger nodules are located on at least a first area and a second area, wherein nodules located on the first area are shaped differently from nodules located on the second area.

6. The glove of claim 1, further comprising a wrist portion associated with the heel that includes a split configured to allow the wrist portion to expand.

7. The glove of claim 6, wherein the split can be selectively closed and secured.

8. The glove of claim 1, wherein the finger and thumb nodules are stiffer than the upper and lower palm nodules.

9. The glove of claim 1, wherein the liner is puncture resistant.

10. A glove, comprising:
    a glove liner consisting of at least one finger, a thumb, a palm, and a heel;
    a plurality of finger pads provided on the at least one finger, the plurality of finger pads being spaced from each other to define a finger fold space, wherein each finger pad includes a plurality of finger nodules;
    a plurality of thumb pads provided on the thumb, the plurality of thumb pads being spaced from each other to define a thumb fold space, wherein each thumb pad includes a plurality of thumb nodules;
    an upper palm pad with a plurality of upper palm nodules located adjacent to the fingers of the glove liner; and
    a lower palm pad with a plurality of lower palm nodules located adjacent to the heel of the glove liner and separated from the upper palm pad by a lower palm fold space, wherein the lower palm pad is discontinuous to define a palm fold space that extends from a heel edge of the lower palm pad towards the upper palm pad.

11. The glove of claim 10, wherein the finger nodules extend around tips of the fingers, and wherein the thumb nodules extend around a tip of the thumb.

12. The glove of claim 10, wherein the finger nodules are located on at least a first area and a second area, wherein nodules located on the first area are shaped differently from nodules located on the second area.

13. The glove of claim 10, further comprising a wrist portion associated with the heel that includes a split configured to allow the wrist portion to expand.

14. The glove of claim 13, wherein the split can be selectively closed and secured.

15. The glove of claim 10, wherein the palm fold space does not extend entirely through the lower palm pad.

16. The glove of claim 15, wherein the finger nodules and thumb nodules are of the same configuration that differ from a configuration of the lower palm nodules.

17. The glove of claim 16, wherein the finger nodules and thumb nodules are pointed and the lower palm nodules are semi-spherical.

18. The glove of claim 15, wherein the finger and thumb nodules are stiffer than the lower palm nodules.

* * * * *